UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF MAKING ACETYL-CELLULOSE PLASTIC COMPOUNDS.

1,229,486.     Specification of Letters Patent.     Patented June 12, 1917.

No Drawing. Original application filed May 24, 1912, Serial No. 699,539. Divided and this application filed July 10, 1915. Serial No. 39,193.

*To all whom it may concern:*

Be it known that I, WILLIAM G. LINDSAY, a citizen of the United States, residing at Caldwell, in the county of Essex and State of New Jersey, have invented certain new and useful Improvements in Processes of Making Acetyl-Cellulose Plastic Compounds, of which the following is a specification.

The various compositions to which the present invention relates are employed in the arts, sometimes as imitations of natural substances and sometimes as films which are used for photographic purposes.

Although the final or useful form of the different compounds of acetyl cellulose is that of a solid or dry material, the different processes of conversion into this final solid form involve, as is well understood, the employment of solutions or mixtures of varying consistency as to elasticity, stiffness, or fluidity, depending generally upon the proportion and kind of solvent used to the amount of the orginal base—acetyl cellulose.

In the manufacture of acetyl cellulose plastic masses by means of methyl alcohol in combination with a "solid solvent" such as paraethyltoluolsulfonamid and the production of solutions for the manufacture of lacquers, varnishes, photographic films, and flexible compounds, I have discovered that the addition of trichlorethylene to the mixture imparts valuable properties to the resultant product, such as increased toughness, plasticity, and flexibility.

In carrying out this invention I prefer a mixture of trichlorethylene and methyl alcohol in substantially equal proportions. This produces a liquid which has the property to gelatinate that variety of acetyl cellulose which is freely soluble in acetone, and it is to that variety of cellulose that this invention relates. This liquid will gelatinate the variety of cellulose mentioned in the cold, or at ordinary room temperature, and the mass so obtained may be worked up into plastic compounds by the addition of paraethyltoluolsulfonamid or other similar substances, such as ethyl acetanilid, tetrachlorethyl acetanilid, methyl acetanilid, and camphor, I prefer however, paraethyltoluolsulfonamid, especially if it is mixed in combination with triphenyl phosphate. Paraethyltoluolsulfonamid exerts a strong solvent action under manipulation with heat and pressure, and the triphenyl phosphate imparts non-inflammability to the mass.

An example of carrying out my invention is as follows: To 100 parts of acetyl cellulose of the variety specified I add 20 parts by weight of paraethyltoluolsulfonamid and 20 parts of triphenyl-phosphate. After carefully stirring these solid ingredients together in order to effect a fairly uniform distribution, I add 100 parts by weight of a mixture composed of from 50 to 62 parts by volume of trichlorethylene and from 50 to 32 parts by volume of methyl alcohol. The combination thus obtained is then worked up in a kneading machine, and after a uniform mixture is obtained the excess of volatile solvent is allowed to evaporate and the resultant dough-like mass is then further worked up in the well-known manner of making nitro-cellulose-camphor compounds.

By paraethyltoluolsulfonamid, I mean the compound having the following structural formula,—

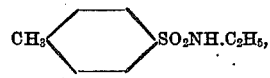

the same being an alkylated aromatic sulfonamid.

Having thus described my invention, what I claim is:

1. The process of making plastic compounds from acetyl cellulose of the variety which is freely soluble in acetone, which comprises:—mixing said acetyl cellulose with trichlorethylene and methyl alcohol to produce a gelatinous mass.

2. The process of making plastic compounds from acetyl cellulose of the variety which is freely soluble in acetone, which comprises:—mixing said acetyl cellulose with trichlorethylene and methyl alcohol to produce a gelatinous mass, and mixing therewith a solid substance which is a solvent for said acetyl cellulose in the presence of said trichlorethylene and methyl alcohol.

3. The process of making plastic compounds from acetyl cellulose of the variety which is freely soluble in acetone, which comprises:—mixing said acetyl cellulose with trichlorethylene and methyl alcohol to produce a gelatinous mass, mixing therewith a solid substance which is a solvent for said acetyl cellulose in the presence of said trichlorethylene and methyl alcohol, allowing the excess of volatile solvent to evaporate and suitably manipulating the resulting mass.

4. The process of making plastic compounds from acetyl cellulose of the variety which is freely soluble in acetone, which comprises:—mixing said acetyl cellulose with trichlorethylene and methyl alcohol to produce a gelatinous mass, and mixing therewith an aromatic sulfonamid which is a solvent for said acetyl cellulose in the presence of said trichlorethylene and methyl alcohol.

5. The process of making plastic compounds from acetyl cellulose of the variety which is freely soluble in acetone, which comprises:—mixing said acetyl cellulose with trichlorethylene and methyl alcohol to produce a gelatinous mass, mixing therewith an aromatic sulfonamid which is a solvent for said acetyl cellulose in the presence of said trichlorethylene and methyl alcohol, allowing the excess of volatile solvent to evaporate and suitably manipulating the resulting mass.

6. The process of making plastic compounds from acetyl cellulose of the variety which is freely soluble in acetone, which comprises:—mixing said acetyl cellulose with trichlorethylene and methyl alcohol to produce a gelatinous mass, mixing therewith an alkylated aromatic sulfonamid which is a solvent for said acetyl cellulose in the presence of said trichlorethylene and methyl alcohol, allowing the excess of volatile solvent to evaporate and suitably manipulating the resulting mass.

7. The process of making plastic compounds from acetyl cellulose of the variety which is freely soluble in acetone, which comprises:—mixing said acetyl cellulose with trichlorethylene and methyl alcohol in about equal volumes thereof to produce a gelatinous mass.

8. The process of making plastic compounds from acetyl cellulose of the variety which is freely soluble in acetone, which comprises:—mixing said acetyl cellulose with trichlorethylene and methyl alcohol in about equal volumes thereof to produce a gelatinous mass, mixing therewith a solid substance which is a solvent for said acetyl cellulose in the presence of said trichlorethylene and methyl alcohol, allowing the excess of volatile solvent to evaporate and suitably manipulating the resulting mass.

9. The process of making plastic compounds from acetyl cellulose of the variety which is freely soluble in acetone which consists in mixing the said cellulose with an alkylated aromatic sulfonamid, trichlorethylene and methyl alcohol, and manipulating the mass, substantially as described.

In testimony whereof I affix my signature.

WILLIAM G. LINDSAY.